US008888633B2

(12) United States Patent
Tohara et al.

(10) Patent No.: US 8,888,633 B2
(45) Date of Patent: Nov. 18, 2014

(54) LOW FRICTION SOUND-TYPE SILENT CHAIN

(75) Inventors: Takashi Tohara, Osaka (JP); Takayuki Morimoto, Osaka (JP); Tsuyoshi Kabai, Osaka (JP); Syouhei Adati, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 736 days.

(21) Appl. No.: 12/762,603

(22) Filed: Apr. 19, 2010

(65) Prior Publication Data

US 2010/0304910 A1   Dec. 2, 2010

(30) Foreign Application Priority Data

May 28, 2009 (JP) ................................. 2009-129309

(51) Int. Cl.
*F16G 13/04* (2006.01)

(52) U.S. Cl.
CPC ...................................... *F16G 13/04* (2013.01)
USPC ......................................................... 474/213

(58) Field of Classification Search
CPC ............ F16G 13/04; F16G 13/06; F16H 7/08
USPC .......................................... 474/212, 213, 214
See application file for complete search history.

(56) References Cited

U.S. PATENT DOCUMENTS

| 1,947,734 | A | * | 2/1934 | Barnes ........................... 474/214 |
| 3,636,788 | A | * | 1/1972 | Jeffrey ........................... 474/213 |
| 4,342,560 | A | * | 8/1982 | Ledvina et al. ............... 474/157 |
| 4,915,675 | A | * | 4/1990 | Avramidis ..................... 474/213 |
| 4,915,676 | A | * | 4/1990 | Komeya ........................ 474/213 |
| 5,628,702 | A | * | 5/1997 | Kotera ........................... 474/213 |
| 6,077,181 | A | * | 6/2000 | Kanehira et al. .............. 474/212 |
| 6,244,983 | B1 | * | 6/2001 | Matsuda ........................ 474/155 |
| 6,533,691 | B2 | * | 3/2003 | Horie et al. ................... 474/213 |
| 7,789,783 | B2 | * | 9/2010 | Young et al. .................. 474/213 |
| 2003/0027675 | A1 | * | 2/2003 | Suzuki et al. ................. 474/212 |

FOREIGN PATENT DOCUMENTS

JP          91-211556        9/1986

* cited by examiner

*Primary Examiner* — Henry Liu
(74) *Attorney, Agent, or Firm* — Howson & Howson LLP

(57) ABSTRACT

In a silent chain of the inner flank engagement and outer flank seating type, the link plate teeth are arranged so that their rearwardly facing inner flanks protrude slightly beyond the outer flank overlapping link plate teeth in a preceding row when the chain is straight and in tension. The rearwardly facing inner flank is composed of an arc-shaped engagement starting region adjacent the tip and a straight engagement guiding region extending toward the root.

8 Claims, 4 Drawing Sheets

LOW FRICTION SOUND-TYPE SILENT CHAIN

CROSS REFERENCE TO RELATED APPLICATIONS

This application claims priority under Title 35, United States Code, §119 (a)-(d) based on Japanese Patent Application No. 2009-129309, filed on May 28, 2009. The disclosure of Japanese Patent Application No. 2009-129309 is herein incorporated by reference in its entirety.

FIELD OF THE INVENTION

The invention relates to a silent chain for use as a timing chain in an automobile and as a power transmission chain in industrial machinery.

BACKGROUND OF THE INVENTION

Silent chains are widely used as timing chains in automobile engines to transmit power from a crankshaft to one or more camshafts, and are also used in many other power transmission applications. A conventional silent chain comprises a large number of interleaved rows of link plates, each plate being bifurcated to form a pair of teeth for engagement with sprocket teeth. The inner engagement surfaces, or "inner flanks," of the teeth are formed so that they bulge out slightly beyond the outer engagement surfaces, or "outer flanks," of adjacent, overlapping, teeth in a preceding row of link plates when the chain is straight and under tension. When the chain is used to transmit power, the inner flank starts to engage with a tooth of a sprocket, but the link plate is seated by contact between its outer flanks and a pair of sprocket teeth.

The travel line of a free span of a conventional silent chain approaching a sprocket moves inward and outward relative to the loop formed by the chain. This inward and outward movement is a result of polygonal movement of the chain, also known as "chordal action," as the chain comes into engagement with the sprocket. As a result of outward movement of the chain, link plates can become inclined slightly forward as they start to engage the sprocket. The sprocket tooth-contacting surfaces of the inner flanks are shaped as circular arcs so that the link teeth slidably contact the sprocket tooth surfaces without excessive friction when starting to engage with, and when separating from, the sprocket. An example of such a chain is shown and described in Japanese Patent Publication No, Hei. 2-19339 for example. Other silent chains have straight inner flanks so that the engagement starting region is straight. However, in the case of chains having straight inner flanks, there is a danger that chordal action and the resulting forward inclination of link plates approaching a sprocket will cause direct clashing of the tips of the link plate teeth with tips of the sprocket teeth.

With the conventional silent chain, even though it is possible to prevent the excessive frictional engagement in starting to engage with the sprocket, contact pressure is high because the contact area immediately after initial engagement of a link plate tooth with a sprocket tooth is small. Consequently, it is difficult to reduce engagement noise.

SUMMARY OF THE INVENTION

The invention is directed toward solving the problem described above by providing a low frictional sound silent chain that engages with a sprocket smoothly and continuously. As the chain engages with the sprocket, initial engagement of the sprocket teeth by inner flanks of the link plate teeth of the chain takes place, and is followed by engagement of the sprocket teeth with outer flanks of adjacent link plate teeth. Frictional sounds that would otherwise be generated are reduced by reducing contact pressure between the chain and the sprocket, resulting in an overall reduction in the noise level produced in the operation of a chain transmission.

A low frictional sound silent chain in accordance with a first aspect of the invention, comprises rows of link plates, each being bifurcated to form a pair of teeth each having a tip and a root. Each of the rows of link plates is interleaved with two other rows of link plates, and connected thereto by connecting pins whereby teeth of the link plates in each row overlap teeth of the link plates in an adjacent row. The inner flank of each tooth is composed of an arc-shaped engagement starting region adjacent the tip of the tooth and a straight engagement guiding region extending from the tip toward the root of the tooth. The term "engagement starting region" as used herein refers to the region of the inner flank of a forward link plate tooth that first comes into contact with a sprocket tooth in the process of meshing as the chain approaches the sprocket when the travel line of the chain is not lifted due to chordal action. The inner and outer flanks are shaped so that, when any part of the chain is straight and under tension, the arc-shaped parts and the straight parts of the inner flanks of the teeth in that straight part of the chain protrude beyond the outer flanks of overlapping teeth in an adjacent row in the same straight part of the chain. Therefore, as the chain engages with a sprocket, inner flanks of the link plate teeth engage the sprocket teeth, and thereafter outer flanks of overlapping teeth in an adjacent row come into engagement with the same sprocket teeth. The arc-shaped engagement starting region should have sufficient curvature that initial engagement takes place between the engagement starting region and a sprocket tooth, and sliding of the inner flank inwardly along the sprocket tooth can take place even when the span of the chain approaching the sprocket tooth is lifted as a result of chordal action. The straight engagement guiding region of the inner flank is preferably positioned on the inner flank so that engagement of the inner flank with the sprocket tooth proceeds continuously and smoothly from the arc-shaped engagement starting region to the straight engagement guiding region.

An advantage of the silent chain according to the first aspect of the invention is that, because the engagement of the chain with the sprocket takes place continuously without interruption, with inner flank engagement followed by outer flank engagement, engagement sounds that would otherwise be generated by outer flank engagement are suppressed, and smooth engagement and seating are achieved.

Because the arc-shaped engagement starting regions of the inner flanks protrude slightly beyond the outer flanks of the overlapping teeth, string vibration in the span of the chain approaching a driving sprocket can be suppressed, and the overall noise produced by the chain transmission can be reduced.

Furthermore, because the inner flanks are composed of arc-shaped engagement starting regions adjacent the tips of the teeth, it is possible to avoid clashing of the tips of the chain teeth with tips of the sprocket teeth even when the free span of the chain approaching the sprocket is lifted as a result of chordal action, causing the link plates to incline slightly forward as they begin to engage with the sprocket. Additionally, because the straight engagement guiding regions extend toward the roots of the teeth, it is possible to reduce the noise level by reducing contact pressure.

According to a second aspect of the invention, the length of the straight engagement guiding region of each inner tooth flank is greater than the length of the arc-shaped engagement starting region. As a result, the engagement impact force exerted between the inner flanks and the sprocket teeth is reduced.

According to a third aspect of the invention, the radii of curvature and the lengths of the arc-shaped engagement starting regions of the inner flanks of the link plate teeth vary non-uniformly along the length of the chain. As a result, timing of engagement between the arc-shaped engagement starting regions of the link teeth and the sprocket teeth varies, and periodic engagement sounds are suppressed.

DETAILED DESCRIPTION OF THE PREFERRED EMBODIMENT

The silent chain according to the invention, comprises interleaved rows of bifurcated link plates, connected by connecting pins and arranged so that teeth of the link plates in each row overlap teeth of the link plates in an adjacent row. When the chain is straight and under tension, the inner flanks of the teeth protrude beyond the outer flanks of the adjacent overlapping teeth so that, as the chain engages with a sprocket, inner flanks of the link plate teeth engage the sprocket teeth, and thereafter outer flanks of the overlapping teeth come into engagement with the same sprocket teeth. The inner flank of each tooth is composed of an arc-shaped engagement starting region adjacent the tip of the tooth and a straight engagement guiding region extending from the tip toward the root of the tooth. These features of the chain according to the invention can be incorporated into any of a variety of embodiments.

The clearance between the straight engagement guiding region of the link plates and the tooth surfaces of the sprocket on engagement can be substantially zero for a sprocket having a maximum number of usable teeth. Therefore, engagement can proceed uninterruptedly from the straight engagement guiding region of an inner flank to the outer flank of a preceding link plate.

The connecting pins that join the interleaved rows of bifurcated link plates may be either round pins or rocker joint pin.

The sprocket teeth that engage with the chain of the invention can be involute teeth, or other forms of teeth provided that they are capable of engaging smoothly with the link teeth of the chain.

Figure 1:
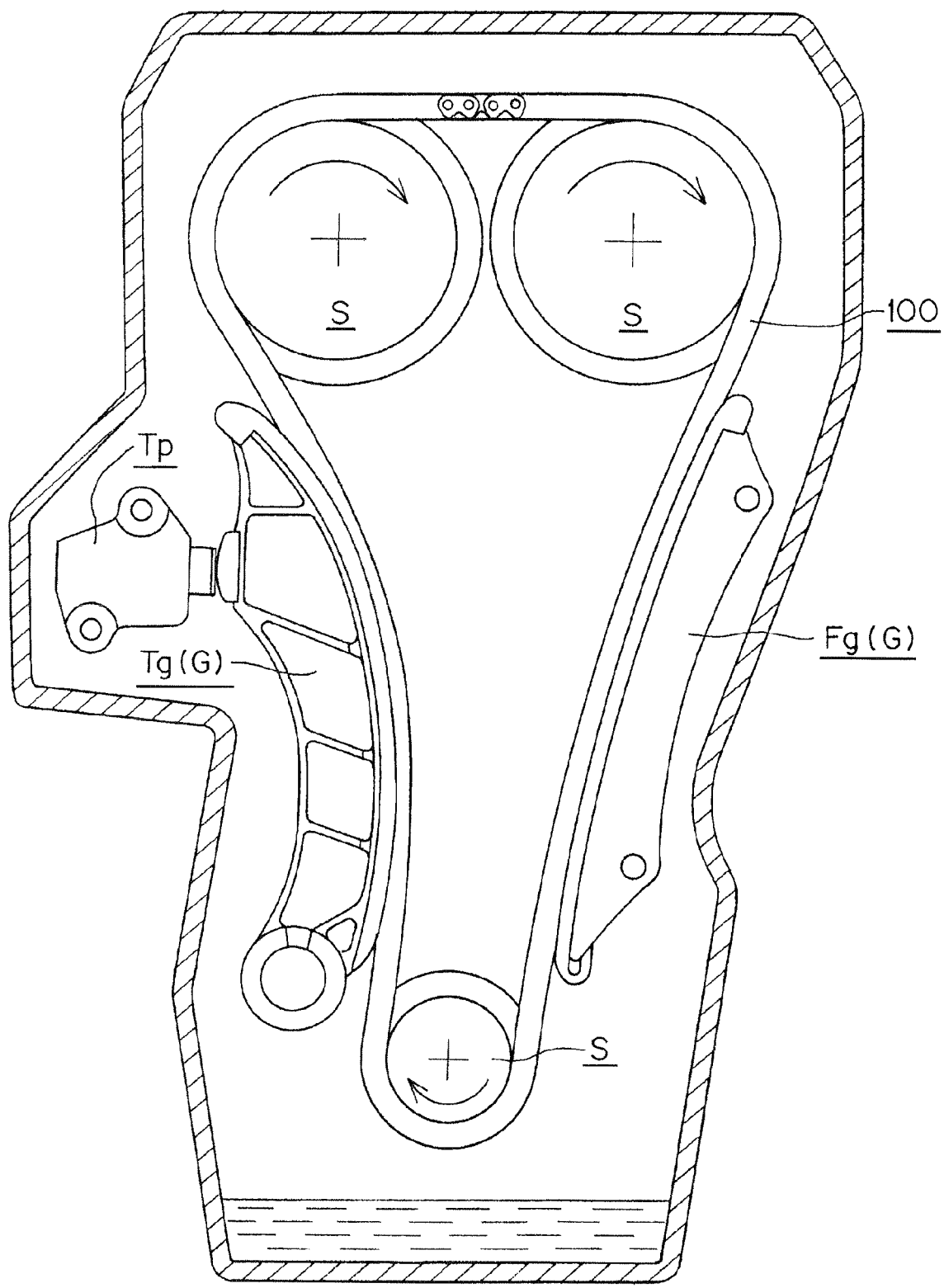
FIG. 1 is a sectional view of a timing transmission enclosure of a dual overhead cam internal combustion engine showing an environment in which the low frictional sound chain according to the invention can be used.

As shown in FIG. 1, which illustrates the use of the low frictional sound silent chain 100 of the invention as a timing chain in an internal combustion engine, the chain in the form of a continuous loop in meshing engagement with three sprockets S, one of which is a driving sprocket on the engine crankshaft, and two of which are driven sprockets on the engine's valve-operating camshafts.

A tensioner Tp applies tension to the chain through a pivoted guide Tg in sliding engagement with the slack side of the chain, i.e., the side traveling from the crankshaft sprocket toward a camshaft sprocket. A fixed guide Fg is in sliding engagement with the tension side of the chain, i.e., the side traveling from a camshaft sprocket toward the crankshaft sprocket. These guides restrict the path of travel of the chain.

Figure 2:
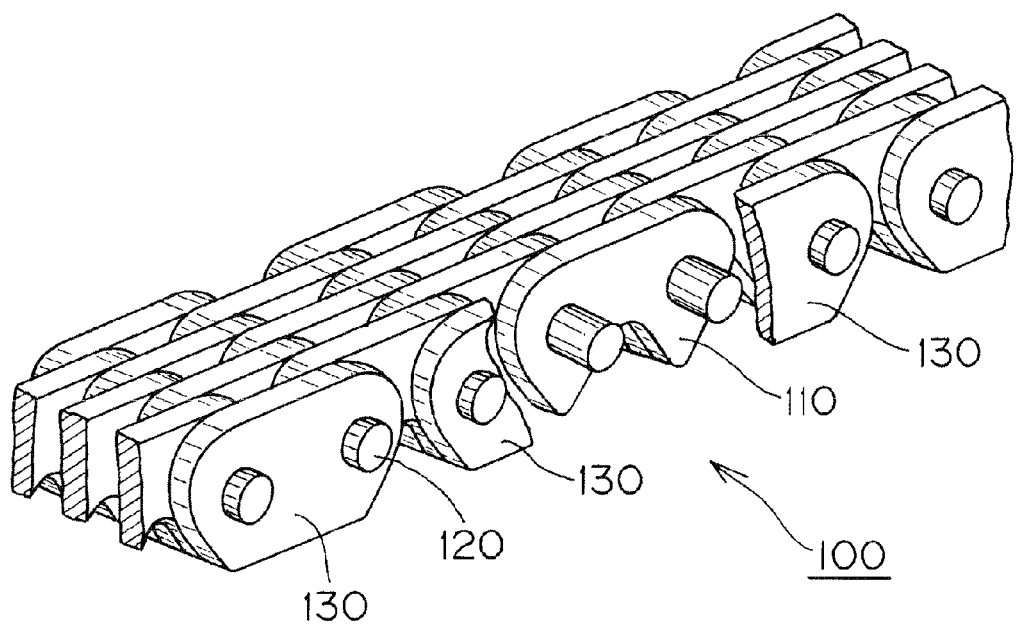
FIG. 2 is a perspective view of a part of the low frictional sound silent chain.
Figure 3:
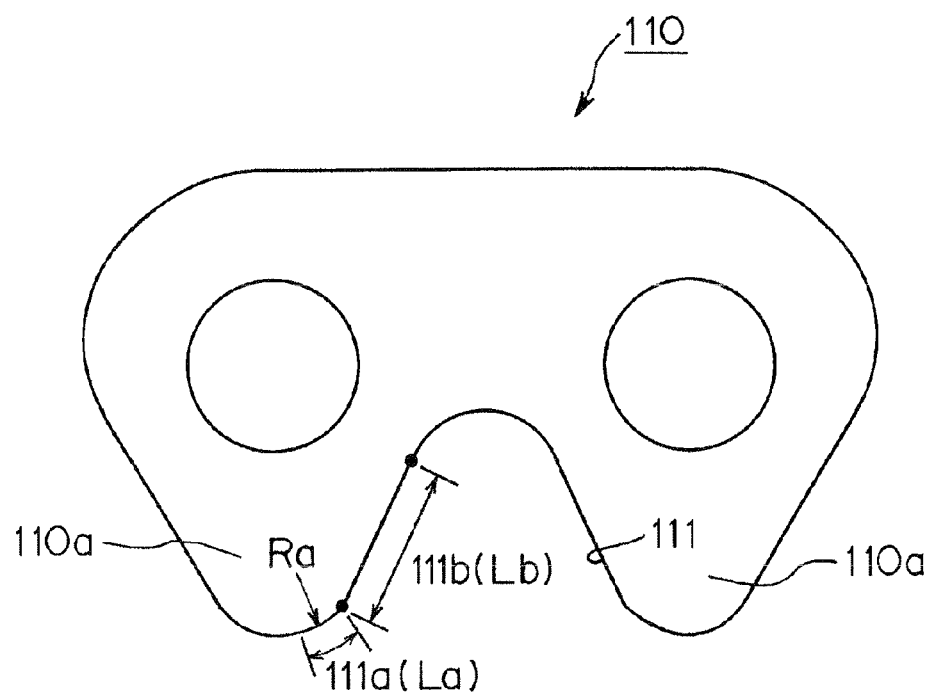
FIG. 3 is an elevational view of a link plate of the low chain of FIG. 2.

As shown in FIG. 2, the chain 100 is composed of a large number of link plates 110, each plate being bifurcated to form pair of teeth 110a (as seen in FIG. 3). The plates are arranged in rows which are interleaved with one another and joined articulably by round connecting pins 120, which extend in the direction of the width of the chain. The plates are configured so that engagement with a sprocket tooth begins with engagement of an inner flank facing in a direction opposite to the direction of chain travel, and so that, when a link plate is fully seated on the sprocket, both of its outer flanks are engaged with sprocket teeth.

As seen in FIG. 2, guide plates 130 are provided on both sides of the chain. These guide plates maintain the path of travel of the chain in alignment with the sprockets. The connecting pins may be fixed to the guide plates and rotatable in pin holes toothed link plates.

Preferably, the sprockets S in FIG. 1 have involute tooth profiles for engagement with the teeth of the chain As shown in FIG. 3, on the forward tooth 110a of the link plate, the inner flank 111, that faces in a direction opposite to the direction of chain travel, is composed of an arc-shaped engagement starting region 111a located at the tip of the link tooth, and a straight engagement guiding region 111b extending from a location adjacent the arc-shaped engagement starting region toward the root of the tooth. The length of the straight engagement guiding region 111b is preferably longer than the length of the arc-shaped engagement starting region 111a. The inner flank of the rear tooth 110a can have the same shape as that of the forward tooth.

Figure 4:
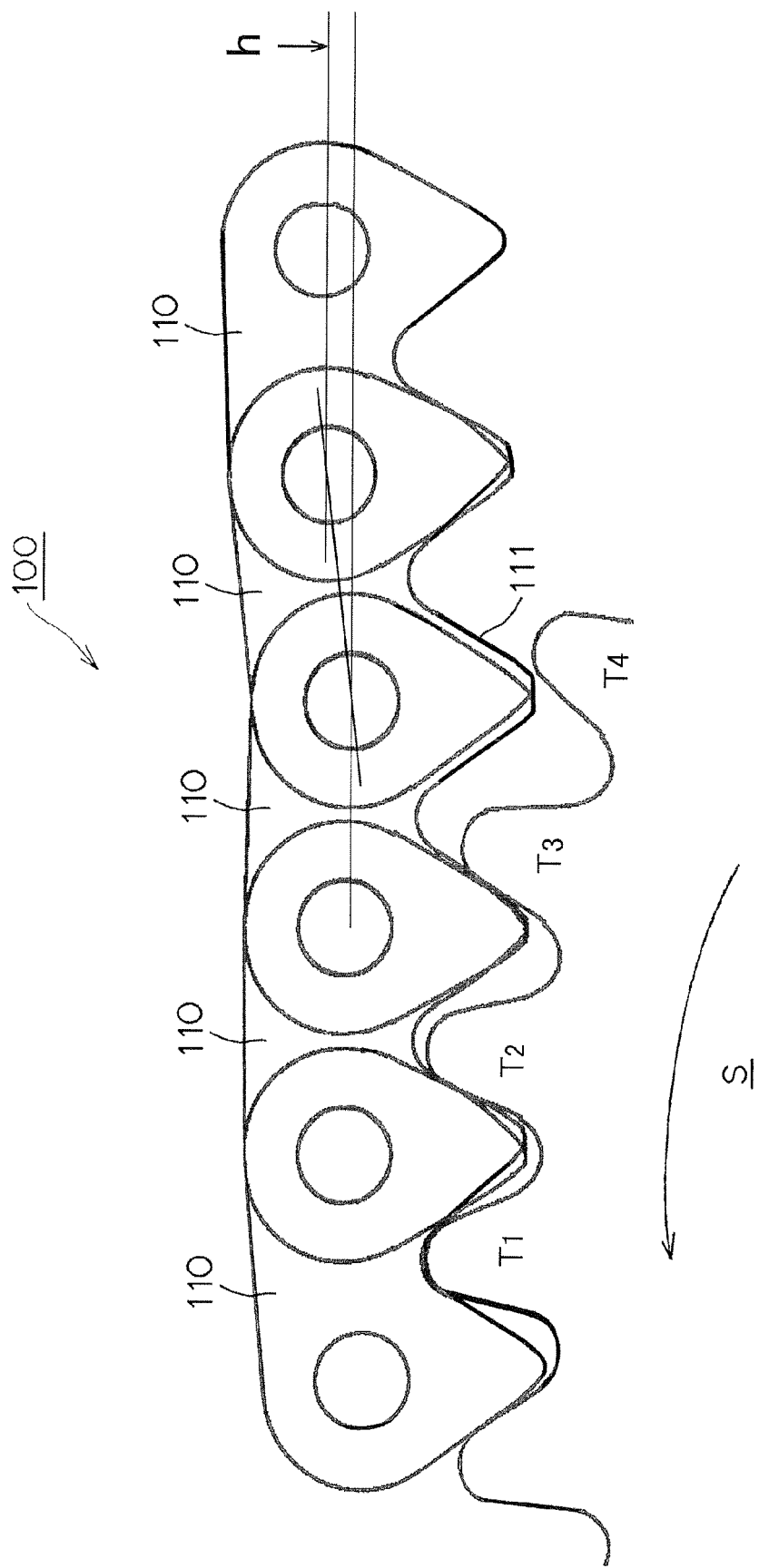
FIG. 4 is a schematic side elevational view of a part of the chain, showing the manner in which the chain comes into engagement with a sprocket.

As seen in FIG. 4, the inner flank 111 of a link tooth protrudes slightly beyond the adjacent outer flank of the overlapping tooth of the preceding link plate, at least when the portion of the chain in which these link plates are located is straight and under tension.

The radius of curvature Ra (FIG. 3) of the engagement starting region 111a, and the length La of the straight engagement guiding region, are preferably the same for all of the link plates in a given row, but vary nonuniformly from row to row along the length of the chain in order to vary engagement timing and thereby avoid setting up periodic vibrations.

The steps by which the low frictional sound silent chain 100 comes into engagement with the teeth of a sprocket S are illustrated FIG. 4. First, a tooth T3 of the sprocket S starts to engage with the chain by contacting an inner flank 111 of a link tooth and specifically by contacting the arc-shaped engagement starting region 111a, formed on the rearwardly facing side of the tip of a forward tooth of a link plate 110. After the start of engagement, and during the rotation of the sprocket through an angle corresponding to the tooth pitch distance, the sprocket tooth moves continuously along the inner flank of the link plate tooth from the arc-shaped engagement starting region 111a to the straight engagement guiding region 111b, so that the condition of engagement is that of sprocket tooth T2 in FIG. 4.

Even if the line of travel of the free span of the chain approaching the sprocket lifts as a result of polygonal movement (also called "chordal action"), and the link plate becomes inclined slightly forward by rotation on a connecting pin upon starting to engage with the sprocket, its arc-shaped engagement starting region 111a comes into moderate engagement with a tooth T4 while the straight engagement guiding region of the preceding link plate is in sliding contact with sprocket tooth T3.

Thus, the sprocket teeth T3 and T4 guide the respective inner flanks 111 of successive overlapping link plates so that they are in contact with the sprocket teeth at the same time.

As the sprocket continues to rotate, the straight engagement guiding region of a link plate tooth flank and an outer flank of an overlapping tooth of a preceding link plate contact a sprocket tooth T3 simultaneously for an instant, reducing contact pressure between the sprocket and the chain. Then, the straight engagement guiding region detaches slightly from the tooth surface T3 as the preceding link plate becomes fully seated with its outer flanks in contact with sprocket teeth. Accordingly, the outer flank 112 of the preceding link plate 110 engages with a sprocket tooth T3, taking the place of the straight engagement guiding region 111b next link plate without any gap, that is, without any interval following initial contact during which none of the teeth in a row of teeth is in contact with a sprocket tooth.

The respective link plates 110 seat on, and engage one by one with, teeth T1, T2, T3 etc. of the sprocket S for transmission of power.

If the travel line of the chain moves outward by a distance h as shown in FIG. 4, the resulting engagement of inner flanks of the link plate teeth with the sprocket teeth increases tension in the chain, compensating for the looseness corresponding to the outward movement of the chain travel line, and suppressing string vibration.

Furthermore, because the low frictional sound silent chain has arc-shaped engagement starting regions, even if the free span of chain approaching the sprocket is lifted by a height h due to chordal action, the abutment of the link plates with the sprocket teeth is advanced, increasing tension of the chain, reducing looseness in the chain and suppressing string vibration.

Because the low frictional sound silent chain 100 of the invention is composed of link plates in which the inner flanks 111 have an arc-shaped engagement starting region 111a adjacent the tip of the tooth and a straight engagement guiding region 111b extending toward the root of the tooth, the link plates engage smoothly with the sprocket teeth with continuously engagement, first by an inner flank 111 and then by an outer flank 112. The chain prevents frictional noise, and thereby reduces the level of the overall noise generated by operation of the chain transmission, by reducing contact pressure between the chain and the sprocket, even if the link plates start to engage the sprocket while inclining forward due to polygonal movement.

Because the straight engagement starting region 111b is to be longer than the arc-shaped engagement starting region 111a, the inner flanks 111 of the link plates 110 in any given row of teeth come into contact simultaneously with the sprocket S. As a result, the engagement impact force of the inner flanks is reduced, the impact sounds may be dispersed to the inner flanks 111 of the preceding overlapping link plates 110.

What is claimed is:

1. A low frictional sound silent chain, comprising:
   rows of link plates, each being bifurcated to form a pair of teeth each having a tip and a root, each of said rows of link plates being interleaved with two other rows of link plates and connected thereto by connecting pins, whereby teeth of the link plates in each row overlap teeth of the link plates in an adjacent row;
   wherein said teeth have inner and outer flanks;
   wherein the inner flank of each of said teeth is composed of an engagement starting region adjacent the tip of the tooth, the engagement starting region being in the form of a circular arc having a constant radius, and a straight engagement guiding region extending from the engagement starting region to the root of the tooth, the root being spaced from said circular arc;
   wherein said inner flanks are shaped so that, when any part of the chain is straight and under tension, the engagement starting regions and the straight engagement guiding regions of the inner flanks of the teeth in said part of the chain protrude beyond the outer flanks of overlapping teeth in an adjacent row in said part of the chain, whereby, as the chain engages with a sprocket, inner flanks of the link plate teeth engage the sprocket teeth and thereafter outer flanks of overlapping teeth in an adjacent row come into engagement with the same sprocket teeth; and
   wherein the inner flanks of each link plate of the chain are shaped so that, even when a link plate of the chain is inclined slightly forward as a result of chordal action, the engagement starting region and the straight engagement guiding region of its forward inner flank are disposed so that the engagement of the inner flank with a sprocket tooth starts at the engagement starting region and continuously shifts from the engagement starting region to the straight engagement guiding region as said sprocket rotates.

2. The low frictional sound silent chain according to claim 1, wherein the radii of curvature and the lengths of the engagement starting regions of the inner flanks of the link plate teeth vary non-uniformly along the length of the chain.

3. The low frictional sound silent chain according to claim 1, wherein the length of said straight engagement guiding region is greater than the length of said engagement starting region.

4. The low frictional sound silent chain according to claim 3, wherein the radii of curvature and the lengths of the engagement starting regions of the inner flanks of the link plate teeth vary non-uniformly along the length of the chain.

5. A chain transmission comprising a driving sprocket, at least one driven sprocket, and a low frictional sound silent chain in meshing engagement with the driving sprocket and said at least one driven sprocket, the chain comprising:
   rows of link plates, each being bifurcated to form a pair of teeth each having a tip and a root, each of said rows of link plates being interleaved with two other rows of link plates and connected thereto by connecting pins, whereby teeth of the link plates in each row overlap teeth of the link plates in an adjacent row;
   wherein said teeth have inner and outer flanks;
   wherein the inner flank of each of said teeth is composed of an engagement starting region adjacent the tip of the tooth, the engagement starting region being in the form of a circular arc having a constant radius, and a straight engagement guiding region extending from the engagement starting region to the root of the tooth, the root being spaced from said circular arc;
   wherein said inner flanks are shaped so that, when any part of the chain is straight and under tension, the engagement starting regions and the straight engagement guiding regions of the inner flanks of the teeth in said part of the chain protrude beyond the outer flanks of overlapping teeth in an adjacent row in said part of the chain, whereby, as the chain engages with a sprocket, inner flanks of the link plate teeth engage the sprocket teeth and thereafter outer flanks of overlapping teeth in an adjacent row come into engagement with the same sprocket teeth;

wherein the engagement starting region has sufficient curvature that initial engagement takes place between said engagement starting region and a sprocket tooth and sliding of said inner flank inwardly along the sprocket tooth can take place even when the span of the chain approaching said sprocket tooth is lifted as a result of chordal action; and wherein the straight engagement guiding region of said inner flank is positioned on said inner flank so that engagement of the inner flank with the sprocket tooth proceeds continuously from the engagement starting region to the straight engagement guiding region even when the span of the chain approaching said sprocket tooth is lifted as a result of chordal action.

6. The chain transmission according to claim 5, wherein the radii of curvature and the lengths of the engagement starting regions of the inner flanks of the link plate teeth vary non-uniformly along the length of the chain.

7. The chain transmission according to claim 5, wherein the length of said straight engagement guiding region is greater than the length of said engagement starting region.

8. The chain transmission according to claim 7, wherein the radii of curvature and the lengths of the engagement starting regions of the inner flanks of the link plate teeth vary non-uniformly along the length of the chain.

* * * * *